June 17, 1958 H. FREEDER 2,838,929
TESTING ENDLESS BELTS FOR VIBRATION
Filed March 23, 1955 2 Sheets-Sheet 1

INVENTOR.
HERMAN FREEDER
BY John W. Harvey
ATTY.

June 17, 1958            H. FREEDER            2,838,929
TESTING ENDLESS BELTS FOR VIBRATION
Filed March 23, 1955            2 Sheets-Sheet 2
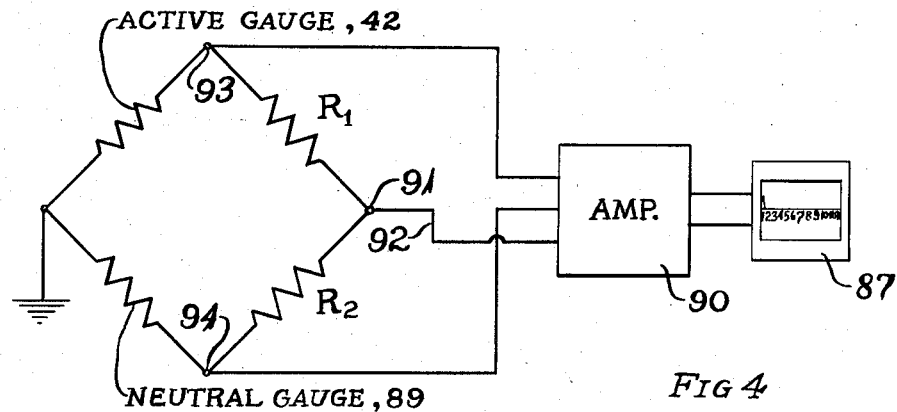
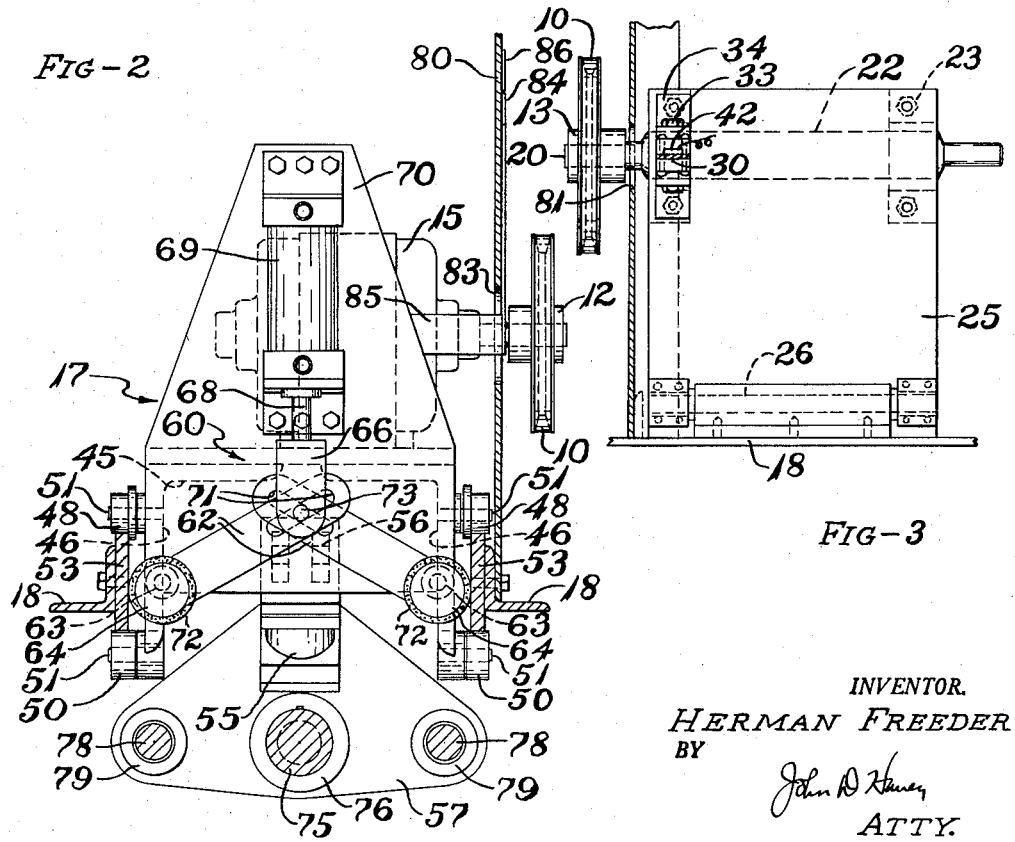
INVENTOR.
HERMAN FREEDER
BY
*John D. Haney*
ATTY.

United States Patent Office 2,838,929
Patented June 17, 1958

2,838,929

TESTING ENDLESS BELTS FOR VIBRATION

Herman Freeder, Akron, Ohio, assignor to The B. F. Goodrich Company, New York, N. Y., a corporation of New York Application March 23, 1955, Serial No. 496,231

5 Claims. (Cl. 73—67)

This invention relates to the inspection and testing of endless belts of rubber and fabric materials such as V-belts for characteristics which would induce objectionable vibration and noise into mechanisms operated by the belts.

A V-belt operating at comparatively high speeds and having certain irregularities or defects in its construction tends to introduce objectionable vibrations and noise or "thumps" into the mechanisms operated by the belt. These objectionable effects may be caused by irregularities such as differences in density of the belt from place to place along its length, imperfect splices in the rubber cushion of the belt, variations in the dimensions of the cushion, or irregular spacing of the tension members, etc., each of which is difficult, if not impossible, to detect by visual inspection or the routine production quality-control practices.

In accordance with this invention equipment is provided for accurately testing each belt to ascertain its vibration-producing characteristics. This equipment is simple to operate and is particularly efficient for large scale production. The preferred apparatus requires no more than about ten to fifteen seconds per belt to determine if a belt is of satisfactory construction. Briefly stated, this equipment includes a pair of sheaves or pulleys about which a test belt is trained and around which the belt is driven at substantially the same speed and under the same tension as required in the intended service for which the belt is designed. One of the sheaves is supported to prevent translational movement of it during a test and is motor driven. The opposite sheave is supported for translational movement in the plane of the motor driven sheave so that a vibration-producing defect in the belt will cause some slight motion of this latter sheave. This motion is sensed by an arrangement of electric strain gauges and is registered on a suitable meter or gauge as a measure of the vibration-producing characteristics of the belt. The meter may be conveniently calibrated to indicate to an operator whether the test belt is of satisfactory or unsatisfactory construction. The apparatus further includes means for shifting the motor driven sheave translationally toward the opposite sheave prior to the actual commencement of a test to permit a belt to be mounted easily about the sheaves, and means for imposing tension on a test belt after it is trained about the sheaves.

The invention will be further described with reference to the accompanying drawings which illustrate equipment constructed in accordance with and embodying this invention.

In the drawings:

Fig. 2 is an enlarged detail view taken on the line 2—2 of Fig. 1;

Fig. 3 is an enlarged detail view taken on the line 3—3 of Fig. 1; and

Fig. 4 is a schematic diagram of suitable electrical apparatus for sensing the vibration-producing characteristics of the belts.

Figure 1:
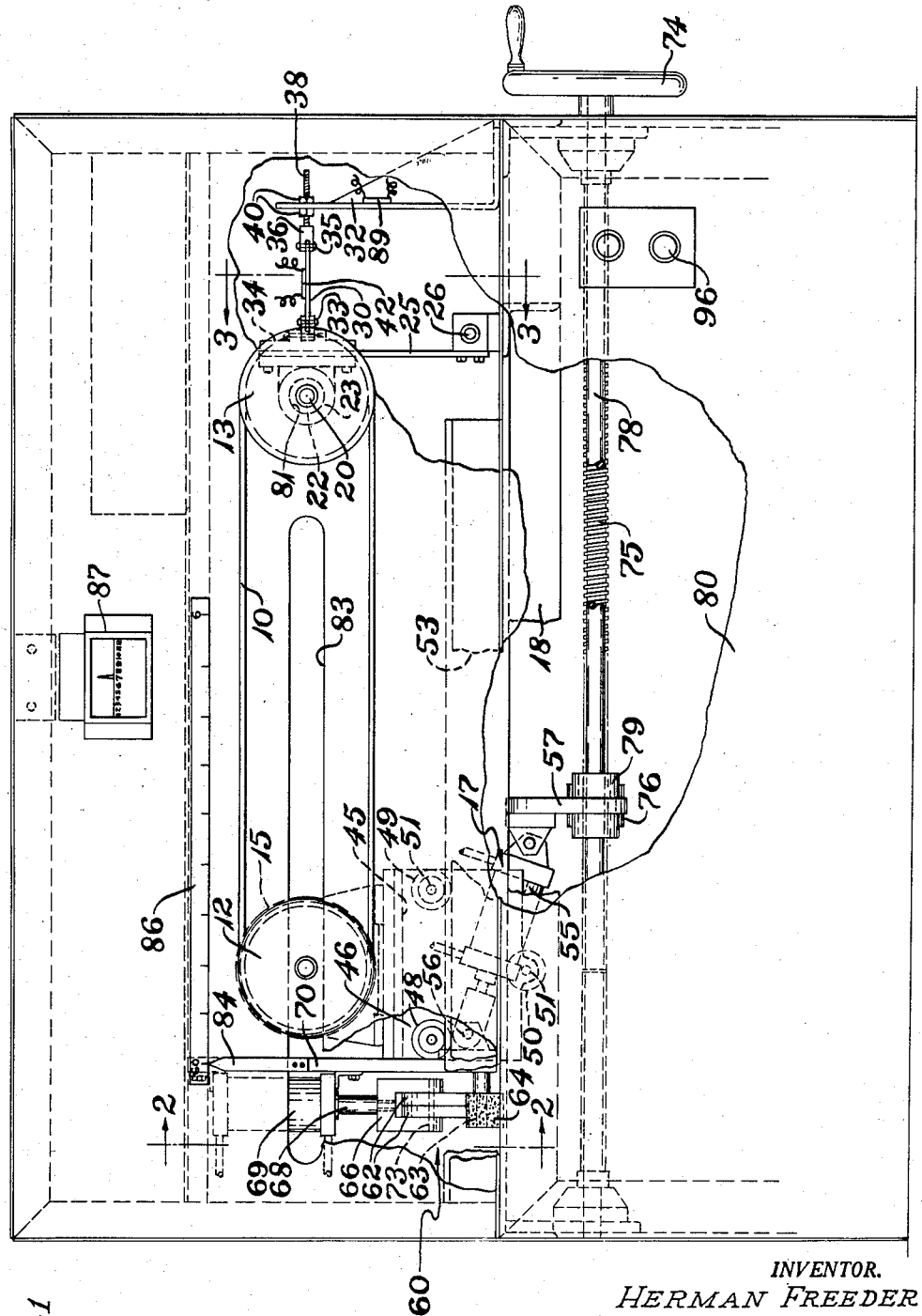
Fig. 1 is a side elevation of the equipment with certain portions broken away.

In Fig. 1 a test belt 10 is shown trained about a pair of accurately balanced sheaves 12 and 13 of appropriate size for the belt and which sheaves are mounted for rotation in a common plane. The sheave 12 is mounted on the rotor of a motor 15 (see Fig. 2) which in turn is secured to a carriage 17 supported by a frame structure 18 of the machine. Sheave 13 is mounted on the end of a shaft 20 journaled in a tubular bearing 22 which is fastened by a pair of bearing clamps 23 near the upper edge of a comparatively wide, thin plate 25 (see Fig. 3) which is hinged along its lower edge to the frame 18 by a hinge pin 26.

The hinged plate 25 is maintained in a substantially vertical position by a narrow, thin flat rigid bar 30 (Fig. 1) which extends horizontally from the upper portion of the plate 25 to an upright rigid bracket 32 secured to the frame 18. One end of the bar 30 is connected to the plate 25 by a bolt 33 (Fig. 3) in a fixture 34 which is secured to the plate, and the opposite end of the bar 30 is fastened by bolts 35 to a fixture 36 having a threaded shank 38 which extends through the bracket and is fastened securely to the bracket by a pair of lock nuts 40. Fastened to a flat side of bar 30, intermediate its ends, is an electric strain gauge 42 which, as is hereinafter explained, is an element of the system for sensing the vibration characteristics of a belt under tests. The unbalance or other constructional characteristic producing vibration as the belt is driven around the sheaves 12 and 13 will cause some slight translational motion in the sheave 13 in the plane of its rotation and therefore a slight pivotal movement of the plate 25. The movement of the plate in turn produces strains in the bar 30 directly proportional to movement of the plate, which strains are detected by means of the strain gauge 42 and the additional elements of the sensing mechanism. In Fig. 3 it may be seen that the bar 30 is connected to the plate 25 at the upstanding margin of the plate adjacent the sheave 13. In this position of the bar the strain gauge is more sensitive to the actual motion of the sheave 13 and lost motion due to deflection of the plate is minimized. Preferably the plate 25 is formed of a light-metal such as aluminum so that the mass of the plate 25 is comparatively low thereby minimizing inertia effects which might otherwise adversely affect the vibration response of the plate 25.

During a test the sheave 12 together with its operating motor 15 and the carriage 17 are locked securely to the frame 18 in a position so that a test belt such as belt 10 is trained tautly around the sheaves under tension substantially similar to belt tension in service. Prior to the commencement of a test the sheave 12 may be moved translationally toward the sheave 13 by means of the carriage 17 so that the belt 10 may be conveniently fitted about the sheaves. After the belt 10 is positioned on the sheaves, the carriage 17 is movable in the reverse direction to exert tension on the belt. The carriage structure includes a horizontal pedestal plate 45 having downwardly directed a leg 46 along each side as shown in Fig. 3. Each of these legs has a set of three carriage-supporting rollers 48, 49 and 50 (see also Fig. 1) mounted on stub shafts 51 projecting laterally from the side of the leg. The rollers of each set are arranged relative to each other in a "triangular" pattern to mutually engage an adjacent horizontal rail 53 secured to the frame 18 along each side of the carriage. The rollers 48 and 49 of each set as shown in Fig. 1 engage the upper edge of rail 53 while the roller 50 engages the lower edge of rail 53 at a position intermediate rollers 48 and 49. This three-point or triangular engagement makes the carriage particularly rigid and thereby maintains the sheave 12 accurately positioned in the plane of the sheave 13.

The carriage 17 is movable along the rails 53 by a fluid-pressure cylinder 55, the piston end of which is pivotally connected by a pin 56 to the bottom of the pedestal plate 45, and the opposite end of which is pivotally connected to a plate 57 below the rails. By operating the cylinder 55 to retract its piston, the carriage 17 and hence the sheave 12 is thereby moved toward sheave 13 so that a belt may be fitted about the sheaves. After the belt is positioned on the sheaves, the belt is tightened to a tension similar to that of service conditions by operating the cylinder 55 in the opposite direction to urge the carriage 17 and sheave 12 away from the sheave 13. The degree of tension exerted on the belt is determined by the stroke of the piston rod of cylinder 55. After the desired tension is established, a locking mechanism 60 mounted on the carriage 17 operates to lock the carriage 17 rigidly to the frame 18 to preclude further movement of the carriage on the rails 53, thereby maintaining the established tension throughout the test.

The locking mechanism 60 includes a pair of link pressure members 62 (see Figs. 1 and 2) each of which is pivotally secured by a pin 63 to the rearward end of the carriage 17 and adjacent the sides of the carriage. Each link 62 terminates in a circular boss 64 which is connected to its respective pin 63 so that boss 64 of the link eccentrically surrounds the pin.

The links 62 extend generally upwardly and inwardly from their respective mounting pins 63 and the upper ends of these links are disposed crosswise of each other within a clevis 66 located at the end of a piston rod 68 of a vertical pressure cylinder 69 secured to a vertical plate 70 at the rear of the carriage. The upper end of each link is formed with a slot 71 extending lengthwise of the link and these ends are pivotally connected to the clevis 66 by means of a clevis pin 73 which fits loosely through the slot 71 of each link and is fastened to the clevis. To lock the carriage relative to the frame 18, cylinder 69 is operated to extend its piston rod 68 thereby urging the clevis 66 downward and swinging the links about their respective pivot pins 63. Owing to the eccentric position of the pivot pins 63 above the radial center of the bosses it may be seen that a portion of the periphery of each boss 64 is brought into engagement with the rails 53 by downward swinging motion of the links. This locking mechanism is particularly effective to maintain the carriage immovable during a test because of the substantial leverage provided by the links in urging the periphery of the bosses against the rails 53. The periphery of each of the bosses 64 is comparatively wide as shown in Fig. 1 and is covered with a strip of friction lining material 72 to further aid in preventing the bosses from slipping lengthwise along the rails 53 during a test.

To test belts of different lengths, the position of the carriage 17 and hence the position of sheave 12 may be adjusted to different positions relative to sheave 13 by means of a hand wheel 74 which rotates an adjusting screw 75 extending through plate 57. As shown in Fig. 2 the plate 57 has a nut 76 rigidly fastened to the plate and engaged with the screw 75 so that rotation of the screw shifts the plate, the cylinder 55 and the carriage 17 translationally relative to sheave 13. The plate 57 is of generally triangular shape and is slidably supported for movement lengthwise of the screw by a pair of laterally-spaced horizontal guide rods 78 which extend through the base corners of the plate and the ends of which are attached to the frame members 18 at each end of the machine. The plate 57 is slidably supported on the guide rods 78 by bushings 79 fastened to the plate. These bushings snugly embrace their respective rods and are of greater length than the thickness of the plate to prevent the plate from tipping forwardly or backwardly during operation of the cylinder 55.

The frame 18 and all of the structure of the machine except the sheaves 12 and 13 are enclosed by sheet metal panels 80 as shown in Figs. 1, 2 and 3. The shaft 20 which supports sheave 13 extends through a hole 81 (Fig. 3) in the front panel of the machine and the sheave 13 is mounted on the end of the shaft outside the panel. Similarly sheave 12 is mounted on the outside of the front panel on the end of the rotor of motor 15, the rotor projecting through a horizontal slot 83 in the front panel to permit horizontal movement of the sheave 12 by the carriage. The proper position of the sheave 12 for a belt of any particular length is indicated by a vertical pointer 84 (Fig. 1) which is mounted outside the front panel on the end of a bar 85 (Fig. 2) which projects through the slot 83 from the plate 70. The pointer 84 registers the size of the belt which may be tested at the particular position of sheave 12 on a graduated scale 86 attached to the outside of the panel.

It has been explained in the foregoing that a vibration-producing irregularity in a test belt 10, as it is driven around the sheaves will induce a corresponding vibration in the plate 25 and in the bar 30 thus changing the resistance of the strain gauge 42. A meter 87 on the front panel is actuated by the variation in the resistance of the strain gauge and the operator, by merely examining the reading on the meter 87, can determine whether the irregularity in the belt is substantial enough to warrant its rejection. Fig. 4 shows a schematic diagram of the connections between the strain gauge 42 and the meter 87. The strain gauge 42 is connected in a bridge circuit with a neutral gauge 89 which is identical with gauge 42 and serves to balance the gauge 42, and with a pair of standard resistors $R_1$ and $R_2$. In the apparatus the neutral gauge 89 is preferably mounted on the back of the bracket 32 as shown in Fig. 1. Since gauge 89 is identical with gauge 42, gauge 89 serves to compensate the bridge circuit for variations in the resistance of gauge 42 because of temperature changes. A reference current is supplied through an amplifier unit 90 to the junction 91 of the circuit by the lead 92. The balanced condition of the bridge is when the carriage 17 is locked to the rails 53 with the belt 10 under the desired tension for the test. A change in the resistance of strain gauge 42 produced by the vibration of plate 25 and the resulting strains in the bar 30 unbalances the bridge and the resulting potential difference across the junctions 93 and 94 is amplified by the unit 90 and is registered on the meter 87 which is preferably an A. C. vacuum tube volt meter.

To summarize the operation of the machine, the operator first adjusts the position of sheave 12 relative to sheave 13 by means of the hand wheel 74 until the pointer 84 registers on the scale 86 the appropriate position for the size of the belt to be tested. At this point in the test cycle, the piston rod of cylinder 55 will be retracted so that the test belt 10 may be fitted about the sheaves. Preferably the carriage 17 is located in a position such that there is sufficient slack in the belt to permit the reaches of the belt between the sheaves to be touched to each other. To start the test, the operator presses a starter button 96 on the front of the machine which operates appropriate solenoid valves (not shown) to actuate cylinder 55 to extend its piston rod thus urging carriage 17 toward the left in Fig. 1 a sufficient distance to produce the desired operating tension in the test belt 10. As soon as the belt is tensioned, the brake actuating cylinder 69 is actuated (by appropriate electrical and hydraulic circuits, not shown) to lock the carriage 17 immovably on the rails 53, and then motor 15 is started so that the belt is driven lengthwise around the sheaves. The vibration, if any, of the hinged plate 25 caused by the belt is sensed by the strain gauge and is registered by the meter 87. Preferably the motor 15 is automatically stopped after about five seconds, which period is sufficient for the operator to note the reading on the meter 87. The brake mechanism is then released, and the cylinder 55 shifts the carriage forwardly toward the plate 25 to relieve tension in the belt so that it may be removed and another test belt installed. A complete test usually takes no more than about ten to fifteen seconds, thus making the machine very efficient for large scale production.

The hydraulic circuits and solenoid valves needed to operate cylinder 55 in proper sequence with cylinder 69 will be evident to those familiar with this art.

Variations of the structure disclosed may be made within the scope of the appended claims.

I claim:

1. A machine for testing endless belts for structural vibration-producing characteristics, the machine comprising a pair of laterally spaced pulleys mounted for rotation in a common rotational plane to receive an endless belt trained around said pulleys, means for tensioning a belt on said pulleys, means for driving one of said pulleys to advance the belt lengthwise under tension around said pulleys, means for supporting the other of said pulleys for oscillation in said rotational plane in response to movement of the belt, a strain gauge connected with the latter said means for generating an electrical signal proportional to oscillations of the pulley supported thereby, and means for visually indicating said signal as a measure of the vibration-producing characteristics of the belt on said pulleys.

2. A machine for testing endless belts for structural vibration-producing characteristics, the machine comprising a frame, a first pulley mounted for rotation at a fixed position on the frame, a second pulley mounted for rotation in a common plane with said first pulley to receive an endless belt trained around said pulleys, means for tensioning a belt trained on said pulleys, means for driving said first pulley to advance the belt lengthwise under tension around said pulleys, a member pivotally hinged to the frame for mounting said second pulley, a stiff rod interconnected from said hinged member to said frame to resist displacement of said member by the tension forces exerted on said second pulley by said belt, a strain gauge on said rod for generating an electrical signal proportional to vibrations in said member resulting from oscillations of said second pulley in the rotational plane thereof in response to vibration-producing characteristics of said belt, and means for visually indicating said signal as a measure of the vibration-producing characteristics of the belt.

3. A machine for testing endless belts for structural vibration-producing characteristics, the machine comprising a frame, a first pulley and a drive unit therefore collectively supported for translational movement on the frame, a second pulley mounted for rotation in a common plane with said first pulley to receive an endless belt trained around said pulleys, means for moving said first pulley and said drive unit relative to the frame away from said second pulley to tension a belt trained on said pulleys, a brake for securing said first pulley and drive unit to said frame with the belt under tension whereby the belt is driven under tension by said first pulley, a member pivotally hinged to the frame for mounting said second pulley, a stiff rod interconnected from said hinged member to said frame to resist displacement of said member by the tension exerted on said second pulley by said belt, a strain gauge on said rod for generating an electrical signal proportional to vibrations in said member resulting from oscillations of said second pulley in the rotational plane thereof in response to vibration-producing characteristics of said belt, and means for visually indicating said signal as a measure of the vibration-producing characteristics of the belt.

4. A machine for testing endless belts for structural vibration-producing characteristics, the machine comprising a pair of laterally spaced pulleys mounted to receive an endless belt trained around said pulleys, means for tensioning a belt on said pulleys, means for driving one of said pulleys to advance the belt lengthwise under tension around said pulleys, means for supporting the other of said pulleys for oscillation in response to movement of the belt, means connected with the latter said pulley-supporting means for generating an electrical signal proportional to the magnitude of said oscillations of the pulley supported thereby, and means for visually indicating said signal as a measure of the vibration-producing characteristics of the belt on said pulleys.

5. A machine for testing endless belts for structural vibration-producing characteristics, the machine comprising a frame, a first pulley, support means for said first pulley mounted for translational movement on the frame, a second pulley and support means therefor connected with the frame to provide for oscillation of said second pulley in response to movement of a belt trained about said pulleys, means for moving said support means for said first pulley relative to the frame away from the second pulley to tension a belt trained about said pulleys, means for fastening said support means for said first pulley to the frame with the belt under tension, means for rotating said first pulley to advance the belt under tension around said pulleys, means engaged with said support means for said second pulley for generating an electrical signal proportional to vibrations induced in said latter support means resulting from oscillations of said second pulley in response to vibration-producing characteristics of said belt, and means for visually indicating said signal as a measure of the vibration-producing characteristics of the belt on said pulleys.

References Cited in the file of this patent

UNITED STATES PATENTS

| 1,103,131 | De Grandpre | July 14, 1914 |
| 1,323,818 | Berry | Dec. 2, 1919 |
| 2,311,762 | Kottman et al. | Feb. 23, 1943 |
| 2,467,752 | Howe | Apr. 19, 1949 |
| 2,598,812 | Marco et al. | June 3, 1952 |
| 2,704,452 | Federn | Mar. 22, 1955 |
| 2,711,647 | Ongaro et al. | June 28, 1955 |

FOREIGN PATENTS

| 616,429 | France | Oct. 29, 1926 |